(12) United States Patent
Nishiyama

(10) Patent No.: US 8,894,283 B2
(45) Date of Patent: Nov. 25, 2014

(54) LINEAR GUIDE DEVICE

(75) Inventor: Kazuhito Nishiyama, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/985,901

(22) PCT Filed: Sep. 13, 2011

(86) PCT No.: PCT/JP2011/005132
§ 371 (c)(1),
(2), (4) Date: Aug. 16, 2013

(87) PCT Pub. No.: WO2012/111052
PCT Pub. Date: Aug. 23, 2012

(65) Prior Publication Data
US 2013/0343680 A1  Dec. 26, 2013

(30) Foreign Application Priority Data

Feb. 18, 2011  (JP) .................................. 2011-033134

(51) Int. Cl.
| F16C 29/08 | (2006.01) |
| F16C 29/00 | (2006.01) |
| F16C 29/06 | (2006.01) |

(52) U.S. Cl.
CPC ........... *F16C 29/005* (2013.01); *F16C 29/0647* (2013.01); *F16C 29/086* (2013.01)
USPC .............................................. 384/15; 384/43

(58) Field of Classification Search
USPC .......... 384/13, 15, 43, 45; 277/345, 380, 411; 464/168
See application file for complete search history.

(56) References Cited

U.S. PATENT DOCUMENTS

| 4,195,852 | A | * | 4/1980 | Roley et al. .................. 277/380 |
| 4,491,373 | A | * | 1/1985 | Sugi et al. ...................... 384/13 |
| 4,921,358 | A | * | 5/1990 | Kasuga et al. .................. 384/15 |
| 5,149,204 | A |   | 9/1992 | Tennichi |
| 5,149,205 | A |   | 9/1992 | Tsukada |
| 5,494,354 | A | * | 2/1996 | Tsukada ........................ 384/13 |
| 5,772,333 | A | * | 6/1998 | Yabe et al. ..................... 384/13 |
| 6,510,614 | B1 |  | 1/2003 | Kato et al. |

(Continued)

FOREIGN PATENT DOCUMENTS

| JP | 1-82330 U | 6/1989 |
| JP | 4-23818 U | 2/1992 |

(Continued)

OTHER PUBLICATIONS

International Preliminary Report on Patentability (PCT/IB/373) including English translation dated Aug. 21, 2013 (nine (9) pages).

(Continued)

*Primary Examiner* — Marcus Charles
(74) *Attorney, Agent, or Firm* — Crowell & Moring LLP

(57) ABSTRACT

A linear guide device includes a guide rail, a slider, and a side seal member attached to an axial direction end part of the slider. The side seal member is formed integrally and has a flat surface facing the guide rail. A clearance between the side seal member and the guide rail is kept the same on a whole of the side seal member, and a thickness in the axial direction of the side seal member is 25 to 140 times the clearance.

5 Claims, 4 Drawing Sheets

(56) References Cited

U.S. PATENT DOCUMENTS

| | | |
|---|---|---|
| 6,572,269 B2 | 6/2003 | Yabe et al. |
| 6,705,430 B2 * | 3/2004 | Michioka et al. .................. 184/5 |
| 8,070,360 B2 * | 12/2011 | Michioka et al. ................ 384/13 |
| 2003/0021711 A1 * | 1/2003 | Klink et al. .................... 417/572 |
| 2003/0059134 A1 | 3/2003 | Mochizuki et al. |
| 2009/0148083 A1 | 6/2009 | Michioka et al. |
| 2009/0180719 A1 * | 7/2009 | Miyata et al. ................. 384/147 |

FOREIGN PATENT DOCUMENTS

| | | |
|---|---|---|
| JP | 4-25028 U | 2/1992 |
| JP | 2001-165162 A | 6/2001 |
| JP | 2002-168248 A | 6/2002 |
| JP | 2002-275312 A | 9/2002 |
| JP | 2003-148628 A | 5/2003 |
| JP | 2003-166532 A | 6/2003 |
| JP | 2006-183747 A | 7/2006 |
| JP | 2008069329 A * | 3/2008 |
| JP | 2010-169183 A | 8/2010 |
| JP | 2011158011 A * | 8/2011 |
| KR | 10-2007-0091149 A | 9/2007 |
| WO | WO 2006/054439 A1 | 5/2006 |
| WO | WO 2012063392 A1 * | 5/2012 ............. F16C 29/06 |

OTHER PUBLICATIONS

Japanese-language Written Opinion (PCT/ISA/237) dated Oct. 11, 2011 (Three (3) pages).

International Search Report dated Oct. 11, 2011 with English translation (Six (6) pages).

Korean Office Action dated Jul. 15, 2014 with English translation (seven pages).

Chinese Office Action dated Jul. 31, 2014 with English translation (nine pages).

* cited by examiner

LINEAR GUIDE DEVICE

TECHNICAL FIELD

The present invention for example relates to a linear guide device suitable for use in a clean room environment.

BACKGROUND ART

As a conventional general linear guide device, for example, the linear guide device linear guide device shown in FIG. 5 is known.

The linear guide device shown in FIG. 5 is provided with a guide rail 101 which extends in the axial direction and a slider 102 which straddles the guide rail 101 in a manner able to move relatively in the axial direction.

The two side surfaces of the guide rail 101 are formed with rolling element rolling grooves 103 which extend in the axial direction. The slider body 102A of the slider 102 is formed at the inside surfaces of two sleeve parts 104 with rolling element rolling grooves 107 which face the rolling element rolling grooves 103. Further, between each of the two facing rolling element rolling grooves 103 and 107, as one example of the rolling elements, a large number of balls B are rollably loaded. Through rolling of these balls B, the slider 102 can move relatively over the guide rail 101 in the axial direction.

Along with the movement of the slider 102, the balls B interposed between the guide rail 101 and slider 102 roll and move to the end parts of the slider 102. However, to continuously make the slider 102 move in the axial direction, these balls B have to be endlessly circulated.

For this reason, rolling element passages 108 which run through the axial direction are formed in the sleeve parts 104 of the slider body 102A, and the two ends of the slider body 102A are fastened with substantially lateral U-shaped end caps 105 through for example screws 112 or other fastening means. The end caps 105 are formed with direction changing channels 106 bent in a semi-arcuate shape connecting the two rolling element rolling grooves 103 and 107 and the rolling element passages 108, whereby rolling element endless circulation raceways are formed.

Further, at the two ends of the slider 102 in the axial direction are fastened a pair of side seal members 111 fastened together with the end caps 105 via screws 112 etc. The side seal members 111 are provided for suppressing the generation of dust from the linear guide device. The side seals 111 are made to have a substantially lateral U-shape in the same way as the end caps 105, their inside circumferences are made seal surfaces which slide against the guide rail 101, and the seals are formed by steel sheets on which rubber is baked.

Note that, in FIG. 5, reference numeral 110 indicates a tap hole for a screw 112 formed at an end face of the slider body 102A, 113 indicates a greasing nipple, and 114 indicates a bolt hole for fastening the guide rail 101.

On the other hand, as a side seal member used in a linear guide device for vacuum environment use, for example, the linear guide device shown in FIG. 6 is known (see Patent Document 1).

The side seal member 211 shown in FIG. 6 is fastened together with the end cap (not shown) to an end face of the slider body (not shown) through screws 215. This side seal member 211 includes a plurality of first and second plates 212 and 213 of thin sheet shapes alternately stacked and a holding plate 214 to which these first and second plates 212 and 213 are attached. The first and second plates 212 and 213 of the side seal member 211 are formed with openings 212a and 213a which match the outer shape of the guide rail 201 (see FIG. 7). The holding plate 214 is also formed with an opening 214a which matches the outer shape of the guide rail 201.

The openings 212a and 213a of the first and second plates 212 and 213 which form the side seal member 211 are larger in size than the outer shape of the guide rail 101, so a clearance is formed between the side seal member 211 and the guide rail 201. For this reason, the side seal member 211 moves along the guide rail 201 while maintaining a slight clearance from it, i.e., without contacting the guide rail 201. If explaining this clearance, the openings 213a of the second plates 213 are slightly larger in shape than the openings 212a of the first plates 212. As shown in FIG. 7, the clearance β between the second plates 213 and the guide rail 201 is larger than the clearance α between the first plates 212 and the guide rail 201 whereby a relief shape is formed. By making the clearance between the side seal member 211 and the guide rail 201 a relief shape, when lubricating oil evaporates and the gas flows between the side seal member 211 and the guide rail 201, a large resistance is caused compared with the case of forming the clearance by a flat shape and the lubricant inside of the linear guide device can be better kept from vaporizing and leaking to the outside.

PRIOR ART DOCUMENT

Patent Document

Patent Document 1: WO 2006/054439

SUMMARY OF THE INVENTION

Problem to be Solved

In this regard, however, in a linear guide device used in a clean room environment, if the fine particles at the inside of the linear guide device escape between the side seal member and the guide rail and form dust, this will cause product defects, so suppression of generation of dust from the linear guide device is demanded more than from a usual linear guide device.

In the case of the side seal member 211 used for the conventional linear guide device for vacuum environment use shown in FIG. 6, a clearance is provided between the side seal member 211 and the guide rail 201, so compared with when making the side seal member contact the guide rail, the amount of generation of dust is smaller. Further, the side seal member 211 includes a plurality of first and second plates 212 and 213 of thin sheet shapes alternately stacked, so the side seal member 211 is thick, fine particles easily stick to the inside of the clearance of the side seal member 211, and the amount of fine particles which escape to the outside can be reduced. For this reason, the side seal member 211 shown in FIG. 6 can conceivably also be used for a linear guide device used in a clean room environment.

However, in the case of the side seal member 211 used for the linear guide device for vacuum environment use shown in FIG. 6, it is necessary to manage the clearance between the plurality of first and second plates 212 and 213 and the guide rail 201. Such management of the amount of clearance is difficult. That is, when stacking a plurality of first and second plates 212 and 213, the plates have to be positioned. In actuality, however, only the amount of clearance between the outermost plate and guide rail can be confirmed visually or using a clearance gauge. The amounts of clearance between the inside plates and the guide rail cannot be checked.

Therefore, the present invention has been made in consideration of the above problems and has an object to provide a linear guide device which enables easy management of the amount of clearance between a side seal member and guide rail, which can reduce the amount of fine particles which escape to the outside of the side seal member, and which is therefore suitable for being used in a clean room environment.

Solution to the Problem

In order to achieve the above object, there is provided a linear guide device comprising: a guide rail having rolling element rolling grooves which extend in the axial direction; a slider having rolling element rolling grooves which face the rolling element rolling grooves of the guide rail and which straddles the guide rail to be capable of moving relatively in the axial direction through rolling of a plurality of rolling elements inserted between the rolling element rolling grooves; and a side seal member attached to an axial direction end part of the slider with a predetermined amount of clearance with the guide rail, wherein the side seal member is formed integrally and has a thickness in the axial direction of 25 to 140 times the amount of clearance.

In addition, In this linear guide device, the side seal member may have flat surfaces which face the guide rail formed and the amount of clearance may be constant in the axial direction.

Advantageous Effects of the Invention

According to the linear guide device according to the present invention, the side seal member is formed integrally, so the side seal member as a whole can be maintained at the same amount of clearance and the amount of clearance between the side seal member and the guide rail can be easily managed. Further, the side seal member has a thickness in the axial direction of 25 times to 140 times the amount of clearance, so the axial direction thickness of the side seal member is large, fine particles easily stick to the inside of the clearance, the amount of fine particles which pass through the clearance and escape to the outside can be reduced, and the overall amount of generation of dust can be reduced. For this reason, it is possible to obtain a linear guide device suitable for a clean room environment. If the thickness of the side seal member in the axial direction is smaller than 25 times the amount of clearance, the axial direction thickness of the side seal member becomes small, fine particles have a hard time sticking to the inside of the clearance, and the amount of fine particles which pass through the clearance and escape to the outside cannot be reduced. On the other hand, if the thickness of the side seal member in the axial direction is larger than 140 times, the axial direction thickness of the side seal member becomes too great and the inconvenience arises of the amount of stroke of the slider (range of possible movement) ending up greatly decreasing.

Further, in this linear guide device, the side seal member has surfaces which face the guide rail formed by flat surfaces in the axial direction. If the amount of clearance is constant in the axial direction, the amount of clearance between the side seal member and the guide rail can be easily managed. Not only that, the amount of fine particles which pass through the clearance and escape to the outside can be reduced more. When, like in Patent Document 1, making the clearance between the side seal member and the guide rail a relief shape, it is necessary to make the fine particles enter deep into the recessed parts (groove parts) to deposit there, but fine particles which do not deposit there may end up being discharged to the outside of the side seal member. By having the surfaces of the side seal member which face the guide rail formed by flat surfaces, it is possible to make the fine particles deposit at the entire clearance between the side seal member and guide rail and possible to decrease more the amount of fine particles which pass through the clearance and escape to the outside.

DESCRIPTION OF EMBODIMENTS

Hereinafter, an embodiment of the linear guide device according to the present invention will be explained with reference to the drawings.

Figure 1:
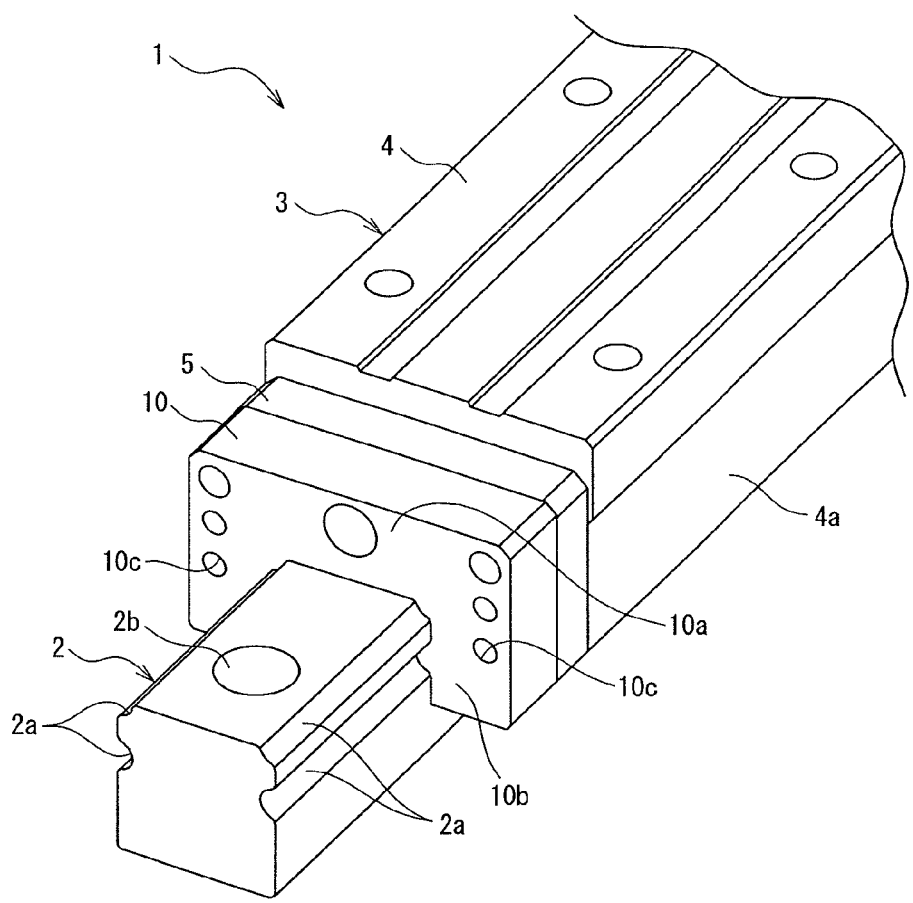
FIG. 1 is a perspective view which shows an embodiment of a linear guide device according to the present invention.

The linear guide device 1 shown in FIG. 1 relates to a linear guide device suitable for use for a clean room environment such as for guiding a conveyor part of a semiconductor production apparatus or liquid crystal production apparatus and is provided with a guide rail 2 which extends in the axial direction and a slider 3 which straddles the guide rail 2 to be able to move relatively in the axial direction.

The two side surfaces of the guide rail 2 are formed with two lines of rolling element rolling grooves 2a which extend in the axial direction. The slider body 4 of the slider 3 is formed at the inside surfaces of its two sleeve parts 4a with rolling element rolling grooves (not shown) which face these rolling element rolling grooves 2a, respectively. Further, between the facing rolling element rolling grooves 2a formed at the guide rail 2 and the rolling element rolling grooves formed at the slider body 4, as an example of the rolling elements, a large number of balls (not shown) are loaded rollably. Through the rolling action of these balls, the slider 3 can move relatively over the guide rail 2 in the axial direction.

Along with this movement of the slider 3, the balls interposed between the guide rail 2 and the slider 3 roll and travel to the end parts of the slider 3, but to enable the slider 3 to continue to move in the axial direction, these balls have to be made to endlessly circulate.

For this reason, inside the sleeve parts 4a of the slider body 4, rolling element passages (not shown) are formed which run through the axial direction and the two ends of the slider body 4 in the axial direction have substantially lateral U-shaped end caps 5 fastened to them. Further, at the end caps 5, between the rolling element rolling grooves 2a formed at the guide rail 2 and the rolling element rolling grooves formed at the slider body 4, direction changing channels (not shown) bent in semiarcuate shapes connecting with the rolling element passages are formed, whereby rolling element endless circulation raceways are formed. Note that, in FIG. 1, reference numeral 2b indicates a bolt hole for fastening the guide rail 2 to another member.

Further, at the two end parts of the end caps 5 of the slider 3 in the axial direction, a pair of side seal members 10 (in FIG. 1, only one side seal member 10 shown) are attached. The pair of side seals 10 are symmetrical in shape, so only one side seal member 10 will be explained.

The side seal member 10, as shown in FIG. 1, is provided with a base part 10a formed in a substantially lateral U-shaped cross-section so as to straddle the guide rail 2 and which extends in a direction traversing the guide rail 2 and a pair of side parts 10b which extend downward from the two ends of the base part 10a in the direction traversing the rail along the two side surfaces of the guide rail 2. The side seal member 10, for example, is integrally formed by a polyester-based elastomer, urethane-based elastomer, polyacetal, or other synthetic resin or a nitrile rubber, fluororubber, or other rubber by injection molding. The side seal member 10 is attached to the axial direction end part of the end cap 5 of the slider 3 through screw holes 10c by not shown screws.

Figure 2:
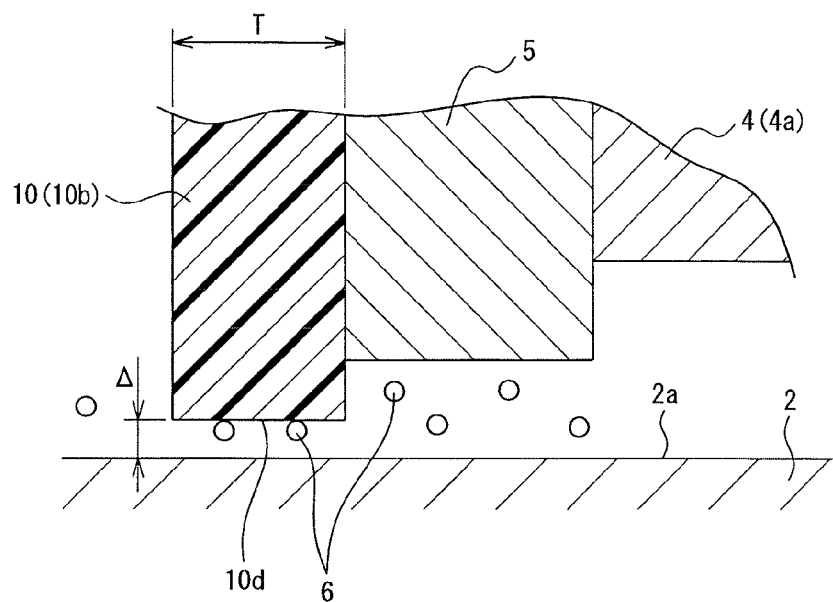
FIG. 2 is a cross-sectional schematic view for explaining the action of a side seal member in the linear guide device shown in FIG. 1.

Here, the side seal member 10, as shown in FIG. 2, is attached so that the amount of clearance between the side parts 10b and the rolling element rolling grooves 2a of the guide rail 2 becomes $\Delta$. This amount of clearance $\Delta$ is, for example, a small 0.1 mm or so.

Further, the thickness T in the axial direction of the side seal member 10 is 25 times to 140 times the amount of clearance $\Delta$. Here, the side seal member 10 is formed integrally, so the side seal member 10 as a whole can be kept to the same amount of clearance $\Delta$ and the amount of clearance $\Delta$ between the side seal member 10 and the guide rail 2 can be easily managed. Further, the side seal member 10 has a thickness T in the axial direction of 25 times to 140 times the amount of clearance $\Delta$, so the axial direction thickness T of the side seal member 10 is thick. As shown in FIG. 2, the fine particles 6 easily stick to the inside of the clearance of the side seal member 10, the amount of fine particles which pass through the clearance and escape to the outside can be reduced, and the overall amount of generation of dust can be reduced. For this reason, it is possible to obtain a linear guide device suitable for a clean room environment.

Figure 3:
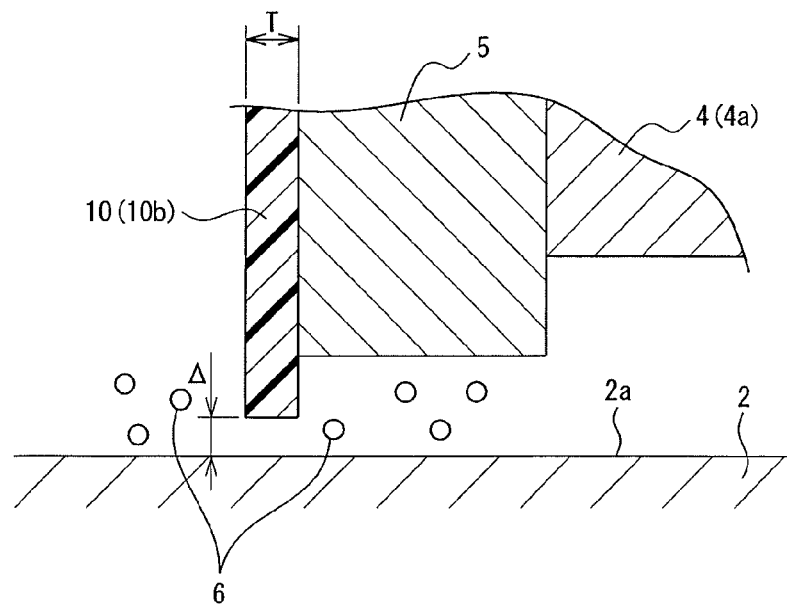
FIG. 3 is a cross-sectional view for explaining the action when making the thickness of the side seal member in the axial direction thinner in the linear guide device shown in FIG. 1.

As shown in FIG. 3, if the thickness T of the side seal member 10 in the axial direction is smaller than 25 times the amount of clearance $\Delta$ (in the example shown in FIG. 3, T/$\Delta$=7 times or so), the axial direction thickness T of the side seal member 10 will be thin, fine particles 6 will have a hard time sticking to the inside of the clearance of the side seal member 10, and the amount of fine particles 6 which pass through the clearance and escape to the outside will not be able to be reduced. On the other hand, if the thickness T of the side seal member 10 in the axial direction is greater than 140 times the amount of clearance $\Delta$, the axial direction thickness T of the side seal member 10 will be too thick and the inconvenience will arise of the amount of stroke of the slider ending up being greatly reduced.

Further, the side seal member 10, as shown in FIG. 2, has surfaces 10d which face the rolling element rolling grooves 2a of the guide rail 2 formed by flat surfaces in the axial direction. The amount of clearance $\Delta$ is constant in the axial direction. For this reason, it is possible to easily manage the amount of clearance $\Delta$ between the side seal member 10 and the guide rail 2. Not only that, it is possible to reduce the amount of fine particles 6 which pass through the clearance and escape to the outside. As shown in Patent Document 1, when making the clearance between the first and second plates 2, 213 which form the side seal member 211 and the guide rail 201 a relief shape, it is necessary to make the fine particles enter deep into the recessed parts (groove parts) to deposit there, but fine particles which do not deposit there may end up being discharged to the outside of the side seal member 211. By having the surfaces 10d of the side seal member 10 which face the guide rail 2 formed by flat surfaces in the axial direction, it is possible to make the fine particles 6 deposit at the entire clearance between the side seal member 10 and guide rail 2 and possible to decrease more the amount of fine particles 6 which pass through the clearance and escape to the outside.

As described above, an embodiment of the present invention was explained, but the present invention is not limited to this. Various changes and improvements may be made.

For example, the material of the side seal member 10 need not be a polyester-based elastomer, urethane-based elastomer, polyacetal, or other synthetic resin or nitrile rubber, fluororubber, or other rubber.

Further, the amount of clearance $\Delta$ between the side seal member 10 and the guide rail 2 does not have to be 0.1 mm or so.

EXAMPLES

To verify the effects of the present invention, the amount of clearance $\Delta$ between the side seal member and the guide rail was set constant (0.1 mm) and the axial direction thickness T of the side seal member was changed to measure the amount of generation of dust. The axial direction thickness T of the side seal member was made 10 times the amount of clearance $\Delta$ (0.1 mm), that is, 1 mm (comparative example), 70 times it, that is, 7 mm (invention example), and 140 times it, that is, 14 mm (invention example). The amount of generation of dust was evaluated by measuring the number of particles of dust of a particle size of 0.1 µm or more per unit volume (0.028 m3). The results are shown in FIG. 4.

Figure 4:
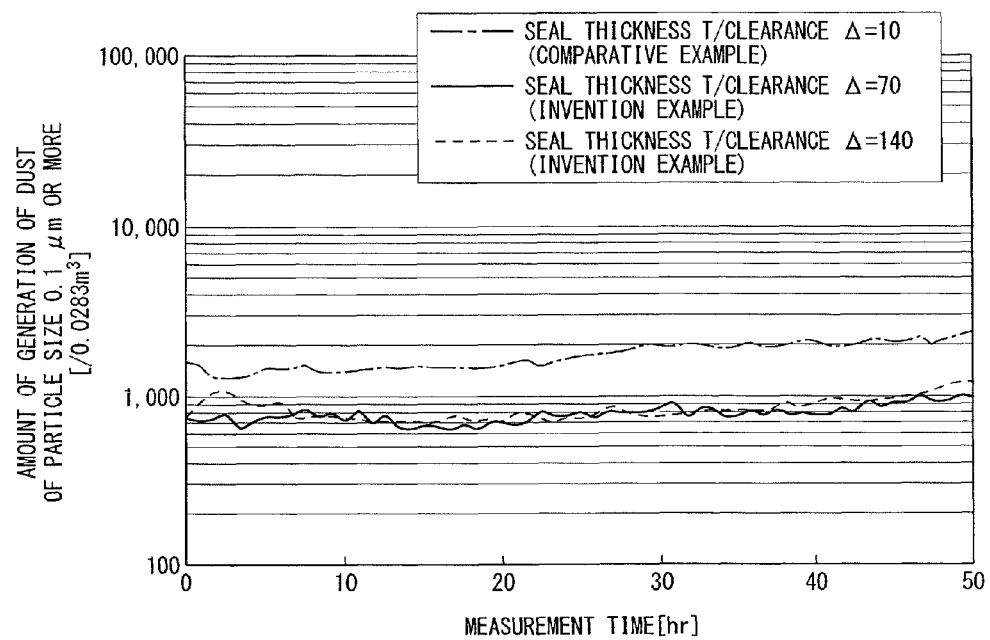
FIG. 4 is a graph which compares the amounts of generation of dust due to differences in thickness of the side seal member in the axial direction in an invention example and a comparative example.
Figure 5:
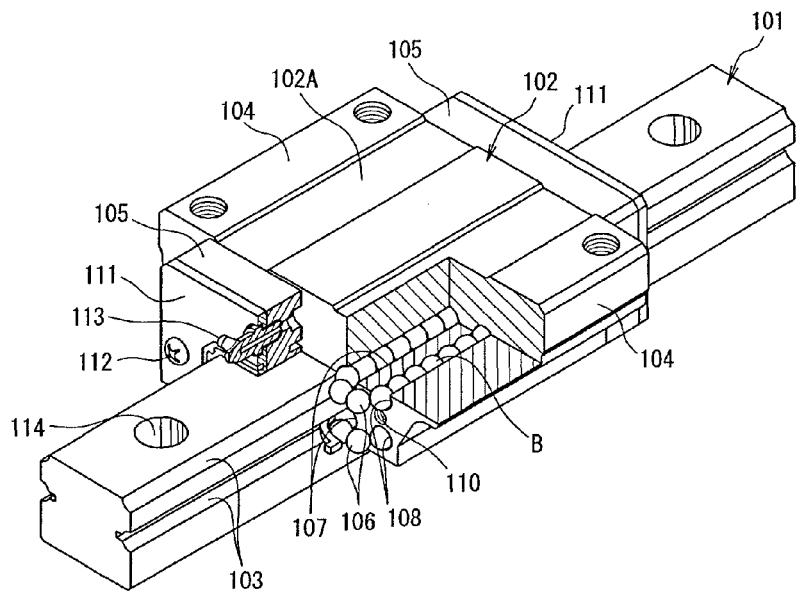
FIG. 5 is a perspective view which shows one example of a conventional linear guide device.
Figure 6:
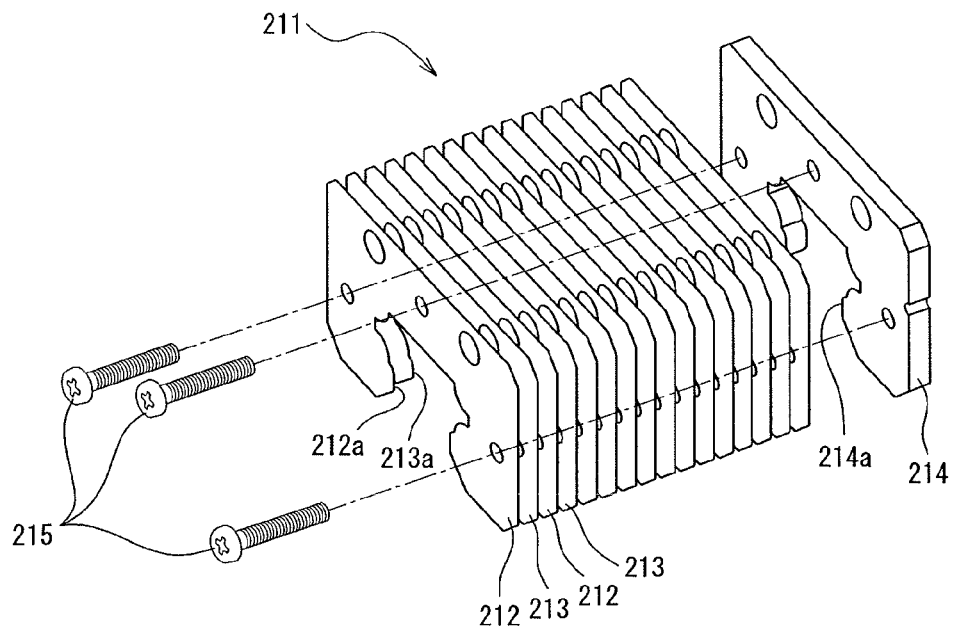
FIG. 6 is a disassembled perspective view of a side seal member used in a conventional linear guide device for vacuum environment use.
Figure 7:
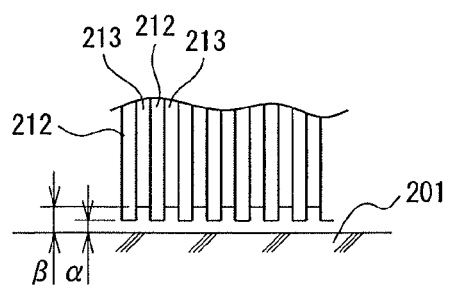
FIG. 7 is a view which shows a relationship between a side seal member shown in FIG. 6 and a guide rail.

Referring to FIG. 4, it is learned that the amount of generation of dust of the invention examples is about ⅓ the amount of generation of dust of the comparative example.

REFERENCE SIGNS LIST 1 linear guide device
2 guide rail
2a rolling element rolling groove
2b bolt hole
3 slider
4 slider body
4a sleeve part
5 end cap
6 fine particles
10 side seal member
10a base part
10b side part
10c screw hole
$\Delta$ amount of clearance between side seal member and guide rail
T thickness in axial direction of side seal member

The invention claimed is:
1. A linear guide device comprising:
a guide rail having rolling element rolling grooves which extend in the axial direction;
a slider having rolling element rolling grooves which face the rolling element rolling grooves of the guide rail and which straddles the guide rail, the slider being configured to move in the axial direction through rolling of a plurality of rolling elements inserted between the rolling element rolling grooves; and a side seal member attached to an axial direction end part of the slider, wherein the side seal member is formed integrally and has a flat surface facing the guide rail, a clearance between the side seal member and the guide rail is kept the same on a whole of the side seal member, and a thickness in the axial direction of the side seal member is 25 to 140 times the clearance.

2. The linear guide device according to claim 1, wherein the predetermined amount of clearance is sized to cause fine particles to remain in the clearance between the side seal member and the guide rail.

3. The linear guide device according to claim 2, wherein a material of the side seal member is a polyester-based elastomer.

4. The linear guide device according to claim 2, wherein a material of the side seal member is a urethane-based elastomer.

5. The linear guide device according to claim 1, wherein the predetermined amount of clearance is sized to cause fine particles to remain in the clearance between the side seal member and the guide rail.

\* \* \* \* \*